United States Patent [19]

Hayes

[11] Patent Number: 4,884,003

[45] Date of Patent: Nov. 28, 1989

[54] COMPACT MICROMOTION TRANSLATOR

[75] Inventor: John B. Hayes, Tucson, Ariz.

[73] Assignee: Wyko Corporation, Tucson, Ariz.

[21] Appl. No.: 291,178

[22] Filed: Dec. 28, 1988

[51] Int. Cl.[4] ............................................. H01L 41/08
[52] U.S. Cl. .................................... 310/328; 310/317; 310/369
[58] Field of Search ............... 310/317, 328, 330–332, 310/366, 369

[56] References Cited

U.S. PATENT DOCUMENTS

| | | | |
|---|---|---|---|
| 3,684,904 | 8/1972 | Galutva et al. | 310/8.0 |
| 3,903,435 | 9/1975 | Bouygues et al. | 310/328 |
| 4,163,168 | 7/1979 | Ishikawa et al. | 310/328 |
| 4,342,935 | 8/1982 | Kallmeyer et al. | 310/369 X |
| 4,349,183 | 9/1982 | Wirt et al. | 267/160 |
| 4,460,842 | 7/1984 | Waanders et al. | 310/338 |
| 4,525,852 | 6/1985 | Rosenberg | 378/34 |
| 4,577,131 | 3/1986 | Soobitsky | 310/328 |
| 4,601,539 | 7/1986 | Watanabe | 310/369 X |
| 4,686,440 | 8/1987 | Matamura et al. | 310/331 X |
| 4,723,086 | 2/1988 | Leibovich et al. | 310/328 |
| 4,725,753 | 2/1988 | Lien | 310/366 X |
| 4,785,177 | 11/1988 | Besocke | 310/330 X |

Primary Examiner—Mark O. Budd
Attorney, Agent, or Firm—Cahill, Sutton & Thomas

[57] ABSTRACT

The translation device includes first and second plates, one movable relative to the other in response to a plurality of piezoelectric transducers. A flexure is located between the first and second plates and attached to each of them to spring-load the piezoelectric transducers. The driver circuit produces voltages which are balanced and applied to the piezoelectric transducers to produce tilt-free translation of the first plate relative to the second.

15 Claims, 4 Drawing Sheets

COMPACT MICROMOTION TRANSLATOR

BACKGROUND OF THE INVENTION

The invention relates to a compact micromotion translator utilizing piezoelectric (PZTs) transducers that are operated to produce precision, tilt-free, linear translation of a translation plate relative to a fixed member.

Various micromotion translators are used in optical measurement instruments to translate an optical test surface or reference surface for the purpose of making highly accurate measurements of optical phase. To accomplish this result, it is necessary to translate an optical reference surface without tilting through a small extremely precise distance relative to a test surface. A typical translation distance may be approximately one micron. Various PZT actuated micromotion translators, such as the one shown in U.S. Pat. No. 4,577,131 (Soobitsky), issued Mar. 18, 1986, are known. The relatively large sizes and the configurations of most known micromotion translators causes them to be susceptible to tilt and mechanical vibrations. In optical interferometers, tilt during translation and mechanical vibration make it difficult or impossible to achieve the accuracy needed for very precise measurement of optical path differences between a reference surface and a test surface. Prior micromotion translators do not achieve translation that is as linear and tilt-free as is desirable for many optical measurement.

There is a presently unmet need for a compact, vibration-resistant, piezoelectric micromotion translator capable of very precise, linear, tilt-free translation of a member through short distances, for example, in the range of a few microns.

SUMMARY OF THE INVENTION

Accordingly, it is an object of the invention to provide a micromotion translator that is compact in structure and relatively insensitive to mechanical vibration.

It is another object of the invention to provide a piezoelectric actuated micromotion translator that avoids tilt during translation.

It is another object of the invention to provide a compact piezoelectric actuated micromotion translator that provides linear, tilt-free operation with a high degree of mechanical stability, is very vibration resistant, and is of simple, compact design.

Briefly described, and in accordance with one embodiment thereof, the invention provides a device for producing tilt-free translation of a first plate relative to a second plate, including a flexure plate located between the first and second plates, spaced locations of the flexure plate being connected to the first plate and the second plate, respectively, and a plurality of spaced piezoelectric transducers connected to move the first plate relative to the second plate. A piezoelectric transducer driver and tilt adjustment circuit coact to apply voltages to the PZTs so as to produce tilt-free, precise translation of the first plate relative to the second plate. In one described embodiment, a mechanical "vibration node" of the flexure plate is connected to one of the first and second plates, other points of the flexure being connected to the other plate to provide a vibration-resistant translation device.

DETAILED DESCRIPTION OF THE PREFERRED EMBODIMENTS OF THE INVENTION

Figure 1A:
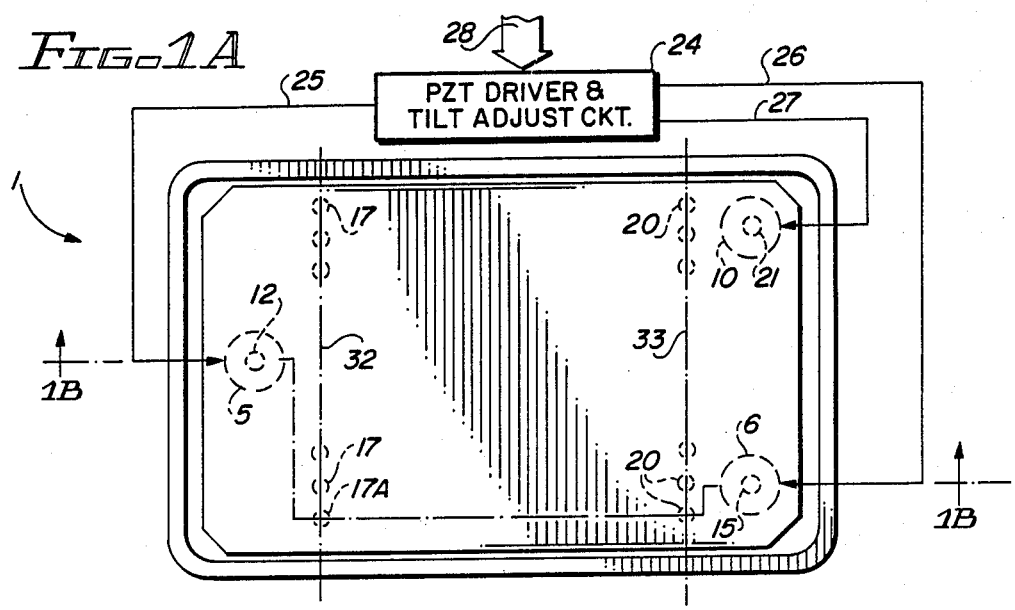
FIG. 1A is a plan view of an embodiment of the micromotion translator of the present invention.
Figure 1B:
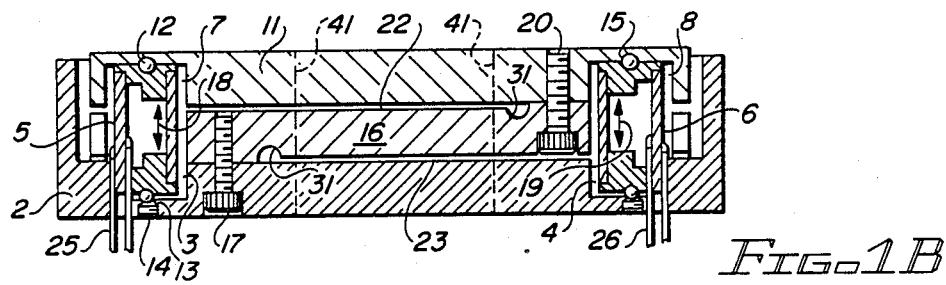
FIG. 1B is a section view along section line 1B—1B of FIG. 1A.

Referring to FIGS. 1A and 1B, micromotion translator 1 includes a stationary base 2 having a pair of cylindrical recesses 3 and 4 in its top surface. The bottom ends of piezoelectric transducers 5 and 6 extend into cylindrical recesses 3 and 4, respectively. A third cylindrical recess, not shown, also extends into the upper surface of stationary base plate 2 and accommodates the bottom end of a third PZT 10.

A translation plate 11 has three cylindrical holes, including recesses 7 and 8 and a third recess (not shown), disposed in a bottom surface. The upper ends of PZTs 5 and 6 extend into recesses 7 and 8, respectively, supporting translation plate 11 a certain distance above base 2. The third PZT 10 extends into the third cylindrical hole to support translation plate 11.

Figure 2:
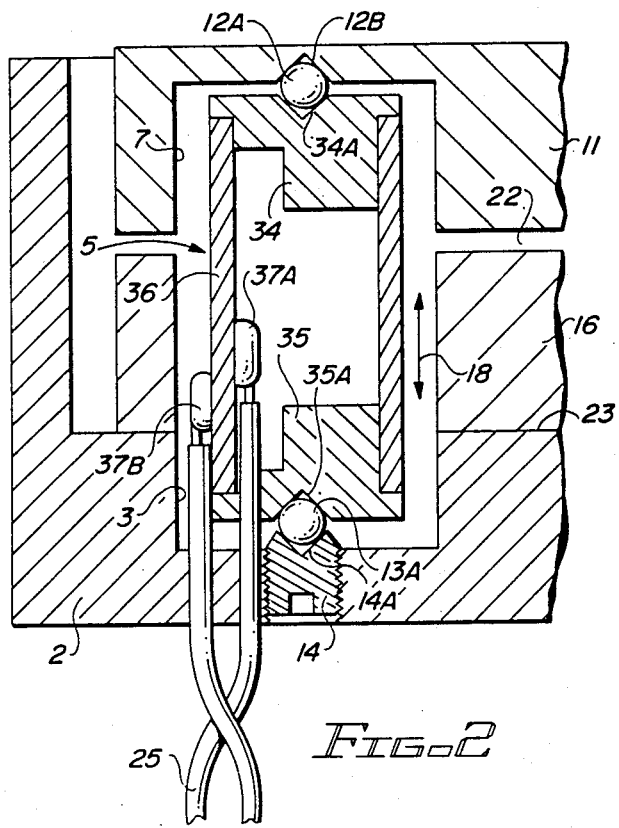
FIG. 2 is an enlarged partial section view of a portion of FIG. 1B.
Figure 3:
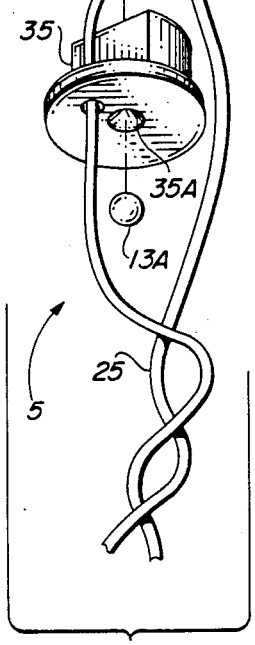
FIG. 3 is a partial perspective exploded view of the piezoelectric transducer used in the embodiment of the invention shown in FIGS. 1A and 1B.

Referring also to FIGS. 2 and 3, PZT 5 includes a ceramic piezoelectric tube 36. In FIG. 3, numeral 38 designates a heat shrink tube composed of an electrically insulating material, such as plastic, which fits over the outer surface of PZT tube 36. The inner surface of piezoelectric tube 36 is connected by an electrical contact 37A to one conductor of a two wire pair 25. The outer surface of piezoelectric ceramic tube 36 is connected by an electrical connection 37B to the other conductor of two wire pair 25. A pair of stiff, electrically insulating caps 34 and 35 are tightly inserted into the upper and lower ends of piezoelectric ceramic tube 36. A conical recess 34A is formed in the top center surface of insulating cap 34, and a centered conical recess is formed in the bottom surface of lower insulating cap 35. A similar conical recess 12B is formed in the upper horizontal surface of recess 7. A conical recess 14A is formed in the upper end of a set screw 14 that is threaded into a hole extending from the bottom surface of base 2 to the bottom of recess 3. A steel ball 12A is supported in conical recesses 12B and 34A. Another steel ball 13A is supported in conical recesses 14A and 35A.

A suitable voltage can be applied between the conductors of two wire pair 25 and adjusted to produce very precise, expanding and/or contracting of the opposed ends of piezoelectric transducer 5 in the directions indicated by arrows 18.

The structure and operation of all the PZTs 5, 6, and 10 is essentially similar.

In accordance with the present invention, a rectangular flexure plate 16 is positioned between the lower surface of translation plate 11 and the upper surface of base 2. The left edge of flexure plate 16 is rigidly attached to the bottom surface of base 2 adjacent to recess 3 by means of six shoulder bolts 17 which extend through a clearance hole in base 2 and into threaded holes in flexure plate 16. Six more shoulder bolts 20 rigidly attach the right edge of flexure plate 16 to the lower surface of translation plate 11 adjacent to the recesses in which transducers 6 and 10 are disposed. If desired, a pair of relief grooves 31 can be provided in the upper and lower surfaces of flexure plate 16 and illustrated in FIG. 1B.

In the presently constructed embodiment of FIGS. 1A,B, the flexure plate 16 is approximately 10 inches square and is approximately one-half inch thick, to provide enough stiffness to avoid mechanical vibration. The clearance between the left side of the upper surface of flexure plate 16 and the bottom left surface of translation plate 11 is approximately 0.015 inches, and is indicated by numeral 22. Numeral 23 designates a similar gap between the upper right surface of base 2 and the bottom right edge of flexure plate 16.

Figure 4A:
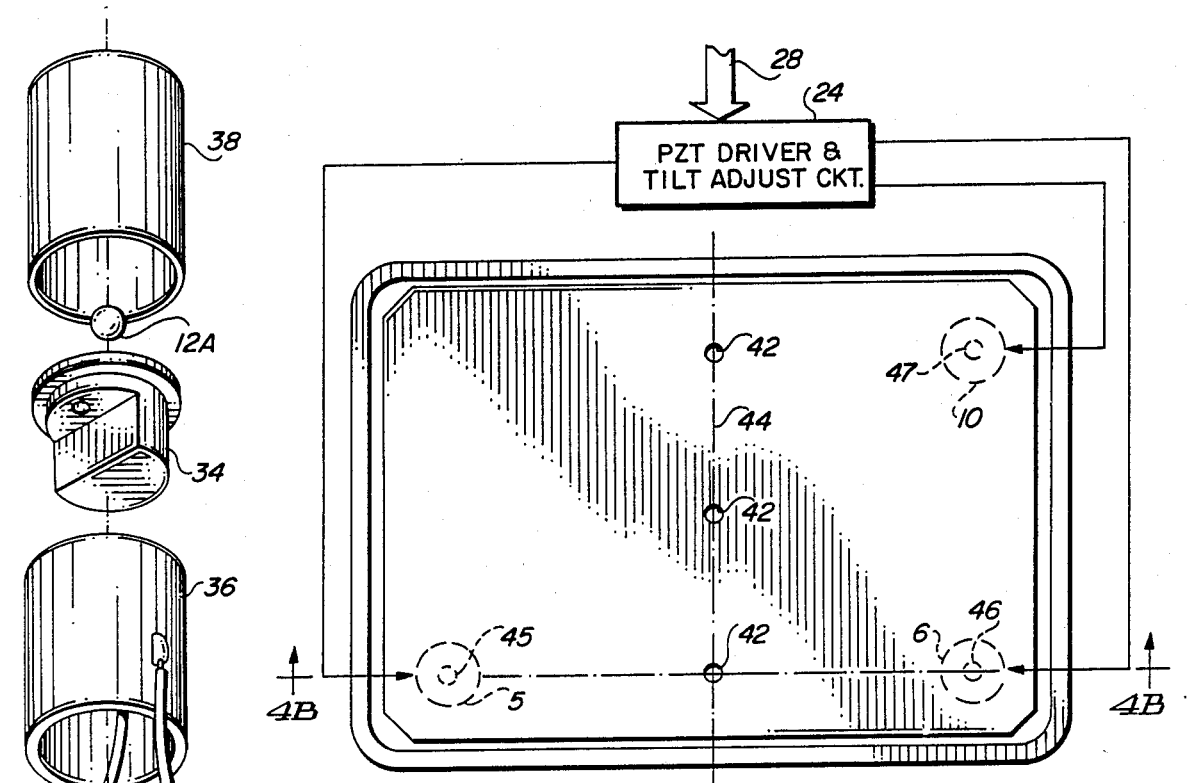
FIG. 4A is a plan view of an alternate embodiment of the invention.
Figure 4B:
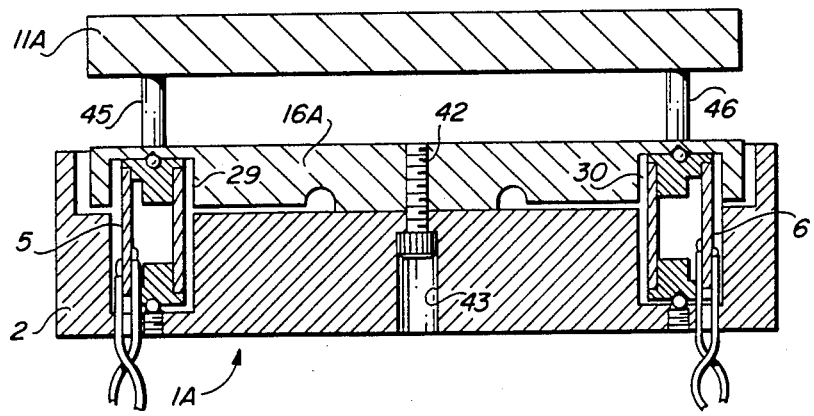
FIG. 4B is a section view taken along section line 4B—4B of FIG. 4A.

To obtain precise, tilt-free translation of translator plate 11 in FIGS. 1A and 1B or translator plate 11A in FIGS. 4A and 4B, the voltages applied to the three PZTs 5, 6 and 10, respectively, must be balanced so that the upper surface of the translator plate moves precisely parallel to the base 2.

In FIGS. 1A and 1B, dotted lines 41 designate an optional hole extending through translation plate 11, flexure plate 16, and base plate 2 to allow passage of a light beam.

Figure 5A:
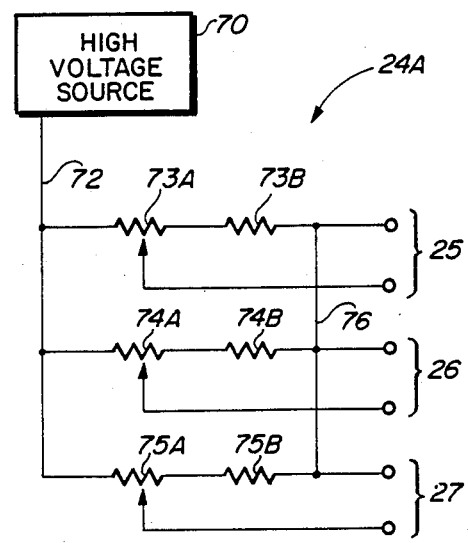
FIG. 5A is a schematic diagram showing details of a tilt adjustment circuit.

Voltages in the range of about zero to a thousand volts applied to PZTs 5, 6, and 10 via two wire pairs 25, 26, and 27, respectively, are generated by a PZT driver and tilt adjustment circuit 24, which receives a voltage via a conductor 28. Circuit 24 includes an adjustable tilt adjustment circuit 24A, shown in FIG. 5A, which derives balanced voltages from the output 72 of a conventional high voltage source 70 to each of the two-wire pairs 25, 26, and 27, respectively, so as to produce tilt-free translation of translator plate 11 relative to base 2. Tilt adjustment circuit 24A includes a leg including a 2 megohm potentiometer 73A and a 10 megohm resistor 73B connected in series between conductors 72 and a ground conductor 76. One wire of two-wire pair 25 is connected to the top of potentiometer 73A and the other wire of two-wire pair 25 is connected to ground conductor 76. Similarly, the conductors of two-wire pair 26 are connected to potentiometer 74A and ground conductor 76, and two-wire pair 27 is connected to potentiometer 75A. The potentiometers 73A, 74A, 75A can be adjusted to balance the voltages applied to PZTs 5, 6, and 10 so as to produce tilt-free translation of plate 11. High voltage source 70 can be controlled by computer 56 to generate step or ramp voltages suitable for various applications of micromotion translator 1.

As alternate but similar embodiment of the invention is shown in FIGS. 4A and 4B, wherein attachment of the translation plate 11A to points near the longitudinal axis of PZT transducers 5, 6, and 10 makes this embodiment very insensitive to mechanical vibration.

Referring now to FIGS. 4A and 4B, the same reference numerals are used as in FIGS. 1A and 1B to designate similar or identical parts. In FIGS. 4A and 4B, flexure plate 16A differs from flexure plate 16 of FIGS. 1A and 1B in that the upper ends of PZTs 5, 6, and 10 extend into cylindrical recesses in the lower surface of flexure plate 16A, rather than in the lower surface of translator plate 11A. The lower surface of translation plate 11A is rigidly connected by posts 45 and 46 and a third post (which is not shown) to the top surface of flexure plate 16A above the center points of the top ends of PZTs 5, 6, and 10. More specifically, the upper end of PZT 5 extends into cylindrical recess 29 in the left side of FIG. 4B. PZT 6 extends into a cylindrical recess 30 in the bottom surface of flexure plate 16A adjacent to the right side thereof. Similarly, PZT 10 extends into a similar cylindrical recess indicated in FIG. 4A. As before, suitable relief grooves can be cut in the bottom surface of flexure plate 16A to reduce the elastic stiffness of flexure plate 16A. Three shoulder screws 42 extend through suitable clearance holes centered in recesses 43 in base 2. The upper ends of each of shoulder bolts 42 extend into threaded holes in flexure plate 16A.

Figure 5:
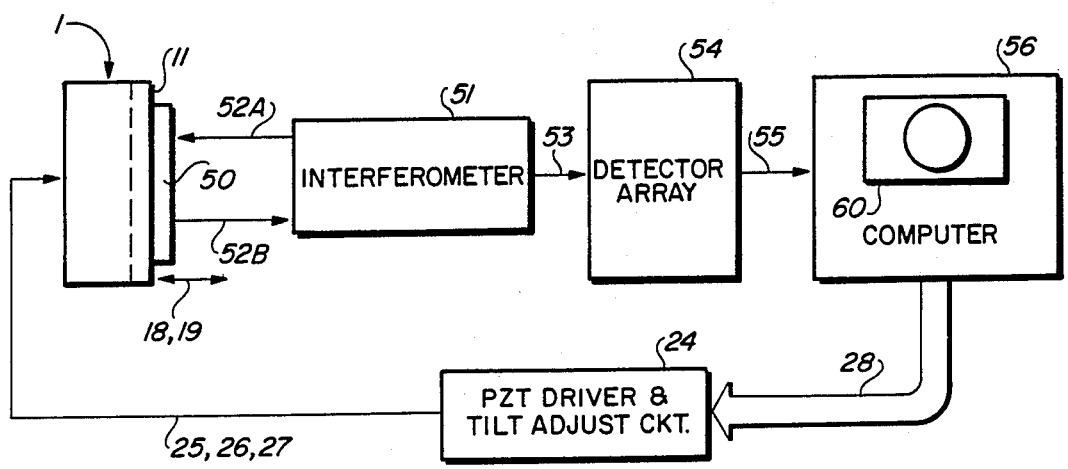
FIG. 5 is a schematic diagram of a system including the micromotion translator of the invention and a system for achieving tilt-free operation thereof.

FIG. 5 shows how the PZT driver and balance circuit 24 of micromotion translator 1 can be operated to produce precision, tilt-free translation of surface 50 supported on the outer surface of the translation plate 11. An interferometer 51 produces a beam 52A that is reflected by the planar surface 50, as indicated by arrow 52B. Interferometer 51 generates an interference beam 53 in which a reference beam produced by interferometer 51 and the reflected test beam 52B are interfered to produce an interference pattern that is detected by photodetector array 54.

Detected signals from array 54 are converted to digital information and received by a computer 56. Computer 56 executes a program by any of a variety of known techniques to compute the optical phase differences representing the amount of translation of the surface 50 relative to the reference surface of the interferometer 51. The computer then encodes the phase differences into a color map. The operator adjusts the potentiometer of the balance circuit 24A of FIG. 5A until the phase shift across the surface 50 is uniform, i.e., until the color of the display is uniform. Thereafter, the voltages produced by the high voltage source 70 of FIG. 5A will be properly balanced between PZTs 5, 6 and 10 to provide tilt-free translation of plate 11.

Figure 6:
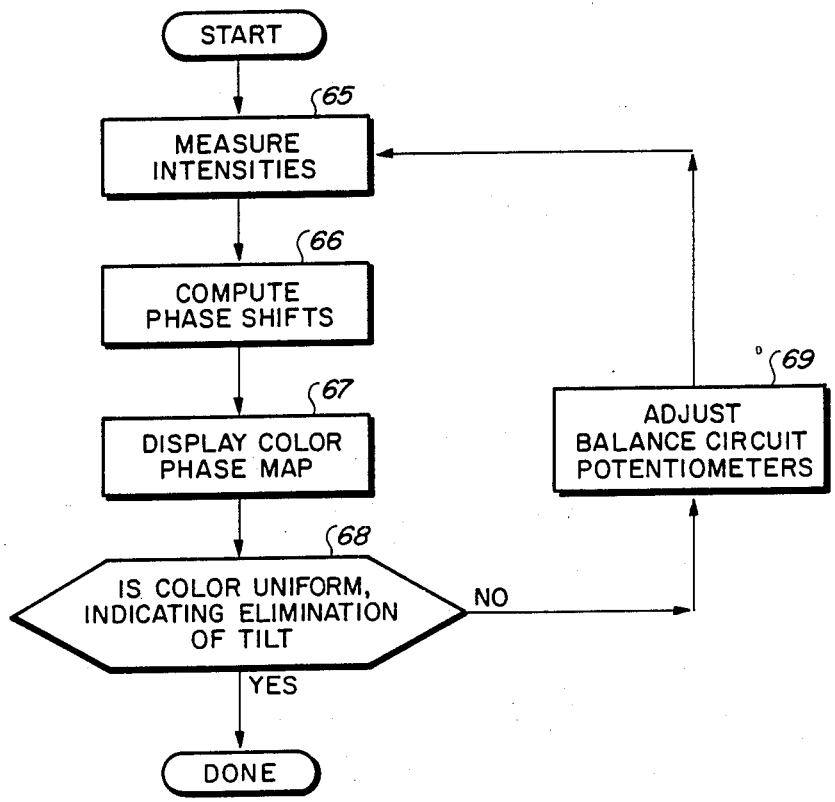
FIG. 6 is a flow chart useful in explaining the operation of the system of FIG. 5.

The flow chart of FIG. 6 illustrates this process. In block 65, the program measures the intensities representing interference patterns produced by interference of the beam 52B reflected from surface 50 and the reference beam produced by interferometer 51. In block 66 the computer program computes the optical phase differences between the reference beam and the test beam, and then encodes the phase differences as a color display, as indicated in block 67. As indicated in block 68, the operator observes the display and determines if the color is sufficiently uniform that the tilt has been eliminated. If it is not, the operator adjusts the potentiometers 73A, 74A, and 75A, as indicated in block 69. This procedure is repeated until an affirmative decision is recited in block 68.

After the balance circuit 24A has been thus adjusted, applied PZT voltages result in precisely equal, simultaneous expansion or contraction of each of the three PZTs, thereby providing precision, tilt-free micromotion translation.

While the invention has been described with reference to several particular embodiments thereof, those skilled in the art will be able to make various modifications to the described embodiments without departing from the true spirit and scope of the invention. For example, if the translation of plate 11 is small enough to avoid "diagonal" vibration modes, it may be practical to effectuate translation with only two, rather than three, PZTs. The connection of the flexure plate 16 can be effectuated with spot welds or continuous welds, rather than the shoulder bolts shown in the drawings. In the device of FIG. 4A, connection of flexure plate 16A to base 2 might be effectuated at only one point.

What is claimed is:

1. Apparatus for tilt-free translation of a first plate relative to a second plate, comprising in combination:
    (a) flexure plate means located between the first and second plates for urging the first and second plates together;
    (b) first, second, and third spaced piezoelectric transducers each expandable and contractible along a corresponding axis;
    (c) means for translating expansion and contraction of each of the first, second, and third piezoelectric transducers to produce translation of the first plate relative to the second plate;
    (d) means for applying first, second, and third voltages to the first, second, and third piezoelectric tranducers, respectively, to cause them to expand or contract equally.

2. The apparatus of claim 1 wherein the voltage applying means includes means for balancing the first, second, and third voltages to the first, second, and third piezoelectric transducers, respectively, to produce tilt-free translation of the first plate relative to the second plate.

3. The apparatus of claim 2 wherein the flexure plate is rectangular.

4. The apparatus of claim 2 wherein a center point of the flexure plate is connected to one of the first and second plates and a plurality of peripheral points of the flexure plate are connected to the other of the first and second plates.

5. The apparatus of claim 2 wherein the first and second plates and the flexure plate are stiff enough and thick enough to avoid substantial vibration.

6. The apparatus of claim 3 wherein one edge portion of the flexure plate is connected to one of the first and second plates and an opposite edge of the flexure plate is connected to the other of the first and second plates.

7. The apparatus of claim 2 wherein each of the first, second, and third piezoelectric transducers engages both the first plate and the second plate.

8. The apparatus of claim 4 wherein each of the first, second, and third piezoelectric transducers engages both the second plate and the flexure plate.

9. The apparatus of claim 8 wherein the center point is a vibration node of the flexure plate.

10. The apparatus of claim 2 wherein the balancing means includes a potentiometer receiving a voltage and a top electrode receiving an adjusted voltage, and means for conducting the adjusted voltage to the first piezoelectric transducer.

11. A method for tilt-free translation of a first plate relative to a second plate, comprising the steps of:
    (a) urging movement of the first plate relative to the second plate by means of a flexure plate located between and connected to the first and second plates;
    (b) resisting movement of the first plate relative to the second plate by means of first and second spaced piezoelectric transducers, each being expandable and contractible along a corresponding axis generally perpendicular to the first and second plates;
    (c) applying a voltage to a balance circuit;
    (d) adjusting the balance circuit to produce first and second balanced voltages to the first and second piezoelectric transducers, respectively, so that tilt-free translation of the first plate relative to the second plate occurs.

12. The method of claim 11 wherein the first and second piezoelectric transducers and also a third piezoelectric transducer are located between the first and second plates, the method including abutting an upper end of each of the first, second, and third piezoelectric transducers against a lower surface of the first plate and abutting a lower end of each of the first, second, and third piezoelectric transducers against an upper surface of the second plate, and wherein step (d) includes adjusting the balance circuit to produce a third balanced voltage to the third piezoelectric transducer so that the tilt-free translation occurs.

13. The method of claim 12 wherein the abutting of the upper ends and lower ends of the first, second, and third piezoelectric transducers, respectively, is performed by ball bearings and means for recesses retaining the ball bearings.

14. The method of claim 12 wherein the first, second, and third piezoelectric transducers are located between the second plate and the flexure plate, the method including abutting an upper end of each of the first, second, and third piezoelectric transducers against a lower surface of the flexure plate and abutting a lower end of each of the first, second, and third piezoelectric transducers against an upper surface of the second plate.

15. The method of claim 11 including aligning the first plate by reflecting a beam from a surface supported by the first plate onto a detector array, electronically scanning intensities of currents produced by photodetectors of the detector array in response to the reflected beam, computing relative phases of the reflected beams, mapping the relative phases to a color map, displaying colors from the color map, and adjusting the balance circuit to produce a uniform color.

* * * * *